Patented May 30, 1950

2,510,047

UNITED STATES PATENT OFFICE 2,510,047

DIAMIDINE OF 2-HYDROXYSTILBENE

Arthur James Ewins, Leigh-on-Sea, England, assignor to May & Baker Limited, Dagenham, Essex, England, a British company No Drawing. Original application December 3, 1943, Serial No. 512,779. Divided and this application February 25, 1948, Serial No. 10,940. In Great Britain November 4, 1941

Section 1, Public Law 690, August 8, 1946
Patent expires November 4, 1961

1 Claim. (Cl. 260—564)

This application is a divisional of patent application Serial No. 512,779, now abandoned, and relates to a new diamidine derivative, 2-hydroxy-4:4'-diamidino-stilbene, and also salts thereof such as the dihydrochloride.

The compound of this invention, as also are the salts thereof, is useful as a therapeutic possessing, as it does, a marked trypanocidal activity. As compared with the non-hydroxy substituted compound, 4:4'-diamidino-stilbene, it exhibits a surprisingly greater therapeutic ratio, an important advantage which could not have been foreseen. The primary product of this invention is prepared, for example, by treating 2-hydroxy-4:4'-dicyano-stilbene in solution or suspension in an anhydrous alcohol (such as ethyl alcohol) with dry hydrogen chloride or dry hydrogen bromide, whereby the cyanogen groups are converted into imino-ether hydrohalide groups and treating the compound so obtained with ammonia to yield the desired diamidine or a salt of the said diamidine. The alcoholic solution or suspension may contain an inert organic diluent such as chloroform or nitrobenzene. In any case, where necessary, the end product is subjected to purification as by recrystallisation.

The starting material, 2-hydroxy-4:4'-dicyano-stilbene, can be made following methods known per se. Thus, for example, it can be prepared from the corresponding 2-nitro compound through 2-amino-4:4'-dicyano-stilbene as hereinafter exemplified.

The invention may be illustrated by, but is not restricted to, the following example:

EXAMPLE

This example illustrates the preparation of 2-hydroxy-4:4'-diamidino-stilbene from 2-hydroxy-4:4'-dicyano-stilbene itself prepared from 2-nitro-4:4'-dicyanostilbene through the corresponding 2-amino compound.

2-nitro-4:4'-dicyanostilbene 10 grams of 2-nitro-p-tolunitrile and 8.1 grams of 4-cyano-benzaldehyde were heated to 170° to 180° C., 1.2 ccs. and 0.6 cc. of piperidine were added at quarter-hour intervals, heating was continued for a further one and a quarter hours, the product cooled, triturated with glacial acetic acid and filtered. The residue was crystallised from glacial acetic acid as yellow needles, melting point 290° C.

2-amino-4:4'-dicyanostilbene 10.0 grams of 2-nitro-4:4'-dicyanostilbene thus prepared were suspended in 200 ccs. of glacial acetic acid and a hot solution of 50 grams of stannous chloride ($SnCl_2.2H_2O$) in 50 ccs. of concentrated hydrochloric acid was quickly added. Rapid reaction occurred and the boiling was continued for a further 4 minutes, the reaction mixture was cooled, filtered, and the stannous chloride residue decomposed with 25% aqueous caustic soda solution. The liberated amine crystallised from glacial acetic acid as yellow needles, melting point 232° C.

2-hydroxy-4:4'-dicyanostilbene 10 grams of 2-amino-4:4'-dicyanostilbene thus prepared were dissolved in 400 ccs. of boiling glacial acetic acid and 200 ccs. of dilute sulphuric acid added; the solution was suddenly chilled and diazotised over one and a half hours at 5° to 10° C. with sodium nitrite (3.0 grams/15 ccs. $H_2O$). The diazonium salt solution was decomposed by boiling for 15 minutes with 600 ccs. of 55% aqueous sulphuric acid solution; the solution was diluted, cooled and filtered. The residue crystallised from ethyl alcohol as lemon yellow prismatic needles, melting point 296° C.

2-hydroxy-4:4'-diamidino-stilbene 10 grams of 2-hydroxy-4:4'-dicyanostilbene were suspended in 250 ccs. of absolute ethyl alcohol and the mixture saturated with dry hydrogen chloride at 0° C. The whole was left for eight days at room temperature. The imino-ether hydrochloride formed was filtered off, washed with dry ether, and dried in the air for a short time. It was then added to 250 ccs. of 10% ethyl alcoholic ammonia and the whole heated for five hours at 45° C. The 2-hydroxy-4:4'-diamidino-stilbene dihydrochloride which separated was crystallised from 10% hydrochloric acid. It forms pale yellow needles, melting point 357° C. (Decomp.).

2-hydroxy-4:4'-diamidino-stilbene was obtained from its dihydrochloride by basification with dilute sodium carbonate. On crystallisation from nitrobenzene, the base separates in the form of micro yellow crystals having a melting point of 235° C. (Decomp.).

Other salts (than the dihydrochloride) of the compound of the invention may be obtained from the dihydrochloride, for example, by the addition of dilute alkali, dissolving the base thus produced in a solution of the appropriate acid (corresponding to the desired salt) and isolating the resulting salt. Thus, for example, the di-isethionate may be produced by treating a solution of the dihydrochloride with alkali carbonate, separating and dissolving the resultant base in aqueous isethionic acid and precipitating the di-isethionate with acetone. The product may be purified by dissolving in hot methyl alcohol containing a trace of water followed by precipitation by the cautious addition of acetone. The di-isethionate has a melting point of 286° C. Alternatively, the said salts (as also the dihydrochloride) may be prepared by reacting the corresponding ammonium salt with 2-hydroxy-stilbene-4:4'-bis-(carboniminoethyl ether) in aqueous alcoholic solution or suspension. Representative examples of such salts, in addition to the dihydrochloride and di-isethionate mentioned above, are the di-$\beta$-hydroxy-propane sulphonate, the di-lactate and the di-methane sulphonate.

The superiority of the compound of this invention over the unsubstituted compound, 4:4'-diamidino-stilbene is shown in the following table giving the respective chemotherapeutic ratios of the compounds, as determined experimentally by their effect on infections of Tr. equiperdum in mice. It will be seen that the product of the invention has a chemotherapeutic ratio at least three times as great as that of 4:4'-diamidinostilbene.

*Table*

| | 4:4'-Diamidino-stilbene | | 2-Hydroxy-4:4'-diamidinostilbene | |
|---|---|---|---|---|
| | I | S | I | S |
| L. D.$_{50}$ mg./g | 0.03 | 0.125 | 0.027 | 0.14 |
| C. D.$_{50}$ mg./g | 0.01 | 0.01 | 0.0035 | 0.0035 |
| C. R. | 3 | 12.5 | approx. 8 | 40 |

I=by intravenous injection.
S=by subcutaneous injection.
L. D.$_{50}$=dosage which kills 50% of uninfected mice.
C. D.$_{50}$=dosage which cures 50% of infected mice.
Chemotherapeutic ratio (C. R.)=$\frac{L. D._{50}}{C. D._{50}}$

I claim:
2-hydroxy-4:4'-diamidino-stilbene.

ARTHUR JAMES EWINS.

REFERENCES CITED

The following references are of record in the file of this patent:

FOREIGN PATENTS

| Number | Country | Date |
|---|---|---|
| 116,718 | Australia | Mar. 25, 1943 |

OTHER REFERENCES

Fulton et al., "Anals. Trop. Med. and Parasit.," vol. 36 (1942), pages 131 to 133.